United States Patent [19]

Kawamura

[11] Patent Number: 5,397,152
[45] Date of Patent: Mar. 14, 1995

[54] SEAT BELT RETRACTOR MOUNTED ON STRUT ASSEMBLY

[75] Inventor: Takahiro Kawamura, Hamamatsu, Japan

[73] Assignee: Suzuki Motor Corporation, Shizuoka, Japan

[21] Appl. No.: 165,407

[22] Filed: Dec. 10, 1993

[30] Foreign Application Priority Data

Mar. 12, 1993 [JP] Japan .................................. 5-051762

[51] Int. Cl.⁶ ............................................ B60R 22/34
[52] U.S. Cl. ............................ 280/807; 280/801.1; 280/808
[58] Field of Search ............... 280/801.1, 808, 807; 296/63

[56] References Cited

U.S. PATENT DOCUMENTS

| | | | |
|---|---|---|---|
| 3,414,291 | 12/1968 | Jantzen | 280/807 |
| 4,863,190 | 9/1989 | Tokarz et al. | 280/808 |
| 5,149,135 | 9/1992 | Konishi et al. | 280/808 |

FOREIGN PATENT DOCUMENTS

| | | | |
|---|---|---|---|
| 532378 | 3/1993 | European Pat. Off. | 280/808 |
| 4003941 | 8/1991 | Germany | 280/807 |
| 59-14545 | 1/1984 | Japan | 280/801.1 |
| 4169360 | 6/1992 | Japan | 280/807 |

*Primary Examiner*—Eric D. Culbreth
*Attorney, Agent, or Firm*—Arnold, White & Durkee

[57] ABSTRACT

There is provided a seat belt device for a vehicle having a seat belt retractor installed on a rear pillar inner panel on which a strut top is disposed, wherein the seat belt retractor is positioned on the strut top.

1 Claim, 5 Drawing Sheets

SEAT BELT RETRACTOR MOUNTED ON STRUT ASSEMBLY

FIELD OF THE INVENTION AND RELATED ART STATEMENT

The present invention relates to a seat belt device used for a vehicle.

FIGS. 4 and 5 shows an example of conventional seat belt device 1 for a vehicle.

With this seat belt device 1, a seat belt retractor 2 of the device is mounted to a rear pillar inner panel 4 at the rear of a strut tower (not shown) using a bolt 3.

In FIG. 5, reference numeral 5 denotes a side body outer panel, and 6 denotes a reinforcement member for the rear seat belt retractor 2.

With such a conventional seat belt device 1 for a vehicle, it is necessary to install the reinforcement member 6 at the portion where the seat belt retractor 2 is fixed to the rear pillar inner panel 4 because the rear pillar inner panel 4 is relatively thin. Therefore, the number of parts increases, thereby the manufacturing cost being increased.

Further, with the conventional seat belt device 1 for a vehicle, the position at which the seat belt retractor 2 is installed lies in a luggage compartment (not shown). Therefore, when the seat belt retractor 2 is installed, the worker must put his/her body into the luggage compartment by extending the upper body, and is forced to work in an unnatural posture in an environment of insufficient lighting.

Furthermore, with the conventional seat belt device 1 for a vehicle, there is some distance between the installation position of seat belt retractor 2 and the passenger (the position where the seat belt is used). Because the amount of rolling of the seat belt increases, the seat belt retractor 2 is more expensive.

Still further, a preservative is usually applied onto the wall surfaces defining a space surrounded by the rear pillar inner panel 4, the side body outer panel 5, and a wheel house (not shown). At this time, a thin vinyl chloride cover is put over the seat belt retractor 2 to prevent the color of preservative from sticking to the seat belt retractor 2. Therefore, because the application of preservative is troublesome, the efficiency of vehicle assembly is decreased.

OBJECT AND SUMMARY OF THE INVENTION

The present invention was made to solve the above problems. Accordingly, an object of the present invention is to provide a seat belt device in which a special reinforcement member need not be installed at a portion where the seat belt retractor is fixed, installation work can be performed in a natural posture, the rolling amount of seat belt retractor is reduced, and the application of preservative is facilitated.

To achieve the above object, according to the present invention, in a seat belt device for a vehicle in which the seat belt retractor is installed to the rear pillar inner panel on which a strut top is disposed, the seat belt retractor is positioned on the strut top.

DETAILED DESCRIPTION OF PREFERRED EMBODIMENTS

Figure 4:
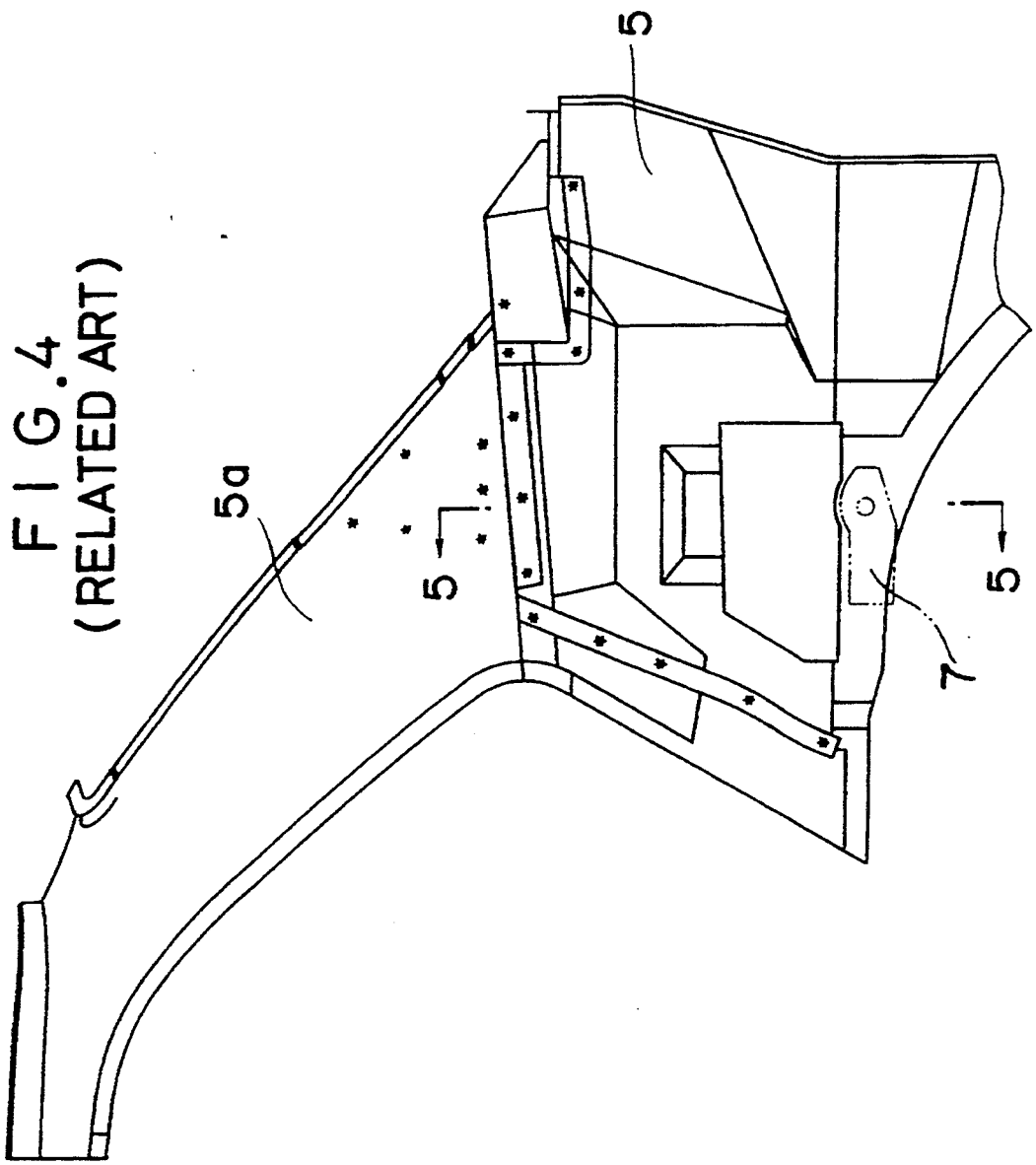
FIG. 4 is a view showing a rear pillar inner panel of a vehicle to which the conventional seat belt device is applied.
Figure 5:
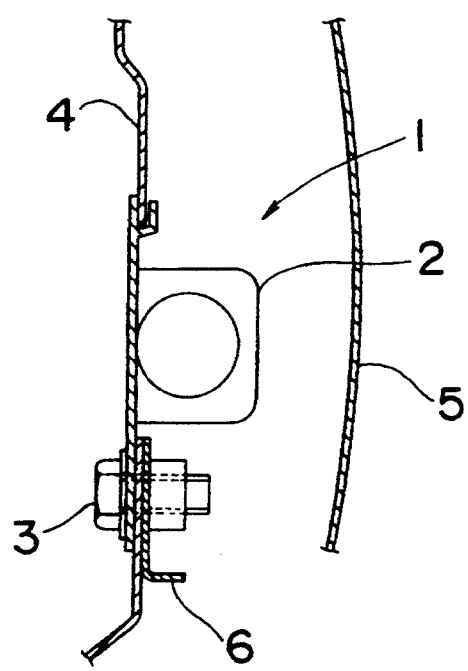
FIG. 5 is a sectional view taken along the line 5—5 of FIG. 4.

One embodiment of a seat belt device in accordance with the present invention will be described in detail below with reference to the attached drawings. For the convenience of explanation, in FIGS. 1 through 3, the same reference numerals are applied to the elements having the same function as that in FIGS. 4 and 5, and the detailed description of the elements is omitted.

Figure 1:
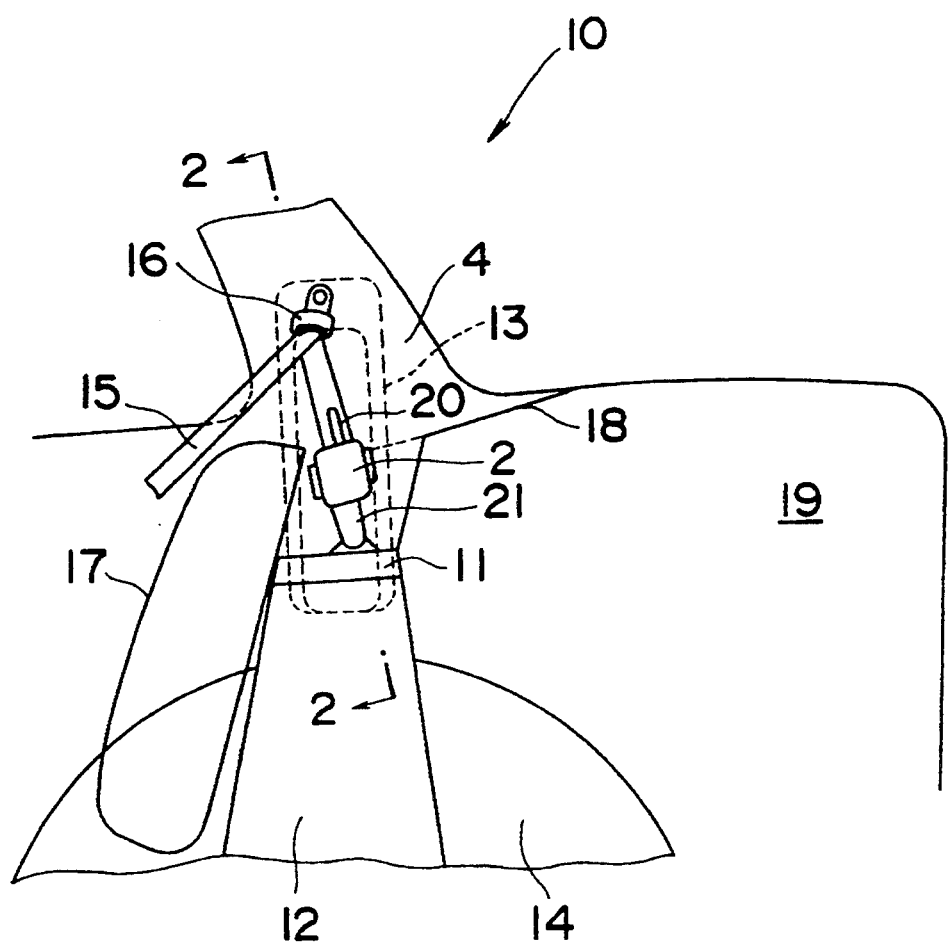
FIG. 1 is a schematic view showing one embodiment of a seat belt device in accordance with the present invention.
Figure 2:
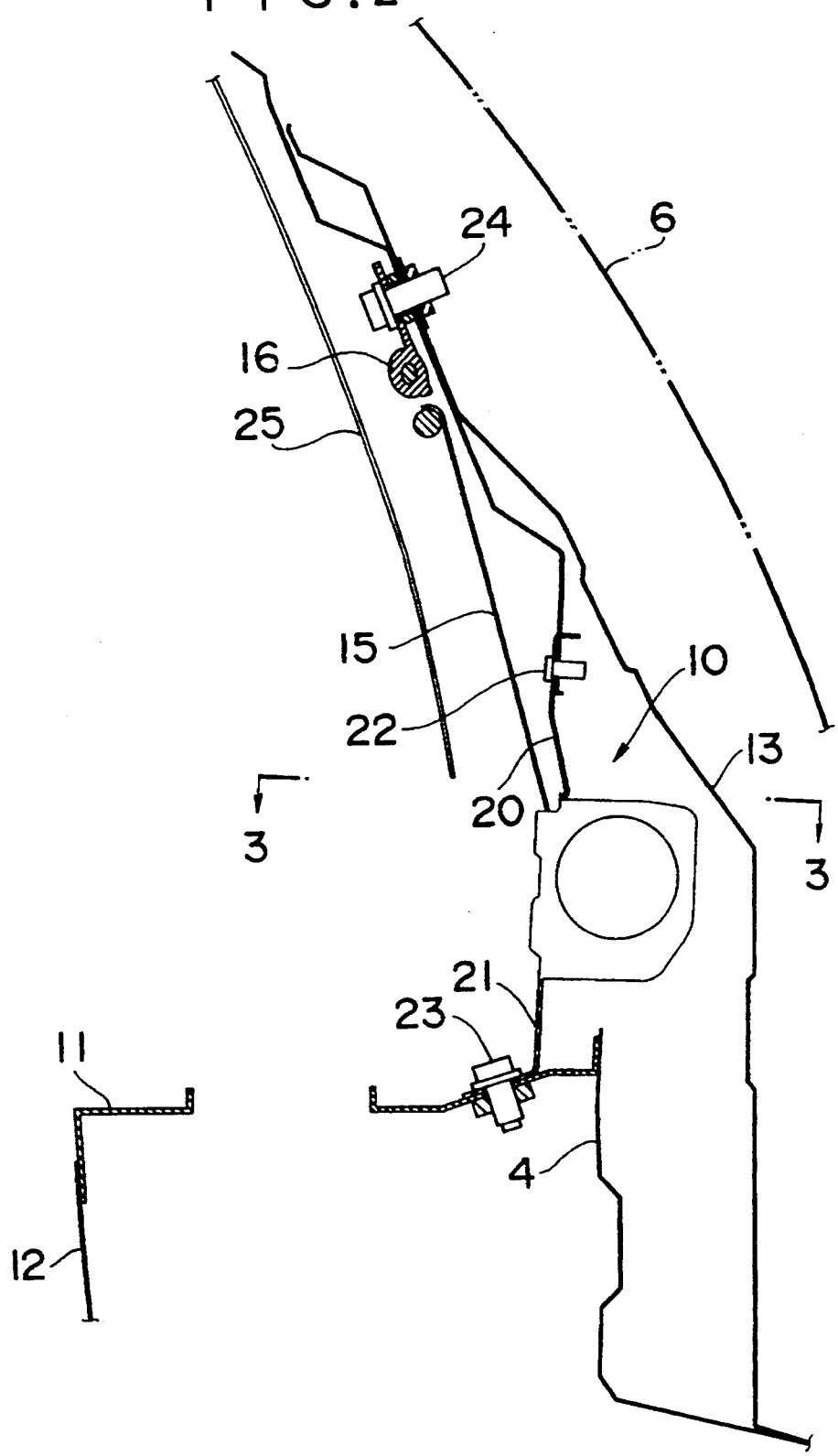
FIG. 2 is a sectional view taken along the line 2—2 of FIG. 1.
Figure 3:
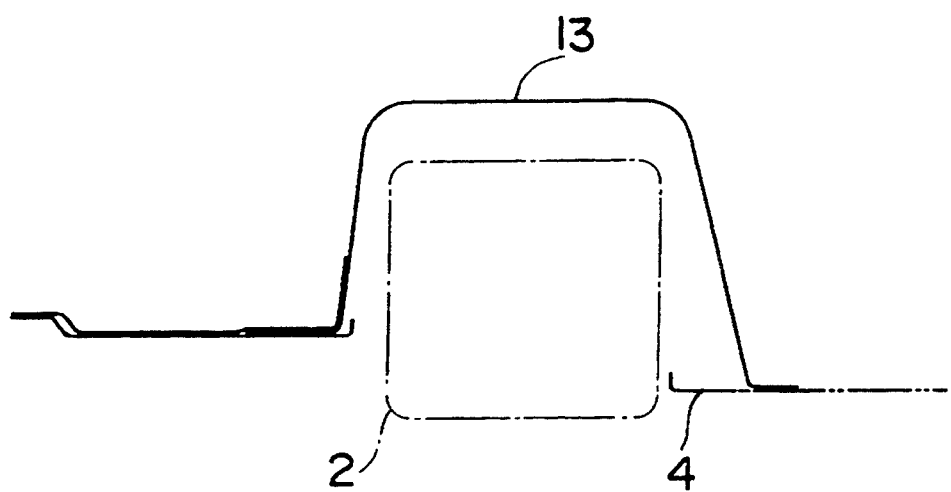
FIG. 3 is a sectional view taken along the line 3—3 of FIG. 2.

FIGS. 1 through 3 show a seat belt device 10 of this embodiment.

With the seat belt device 10 of this embodiment, a seat belt retractor 2 is installed to a rear pillar inner panel 4 on which a strut top 11 is disposed.

In particular, the seat belt retractor 2 is positioned on the strut top 11, and installed thereon. The strut top 11 is disposed on top of a strut tower 12.

A rear pillar inner reinforcement member 13 is installed to the rear pillar inner panel 4 so as to be positioned between the rear pillar inner panel 4 and a side body outer panel 5.

The rear pillar inner reinforcement member 13, which extends from the lower position to the upper position of the strut top 11, is fixed to the rear pillar inner panel 4 so as to cover the seat belt retractor 2 on the inner side (cabin side) of the reinforcement member 13 (refer to FIG. 2).

The rear pillar inner reinforcement member 13 is formed in a substantially U shape in the horizontal cross section as shown in FIG. 3, and the seat belt retractor is positioned within the reinforcement member 13. Each end of the rear pillar inner reinforcement member 13 comes in contact with the rear pillar inner panel 4 and is fixed thereto.

In FIG. 1, reference numeral 14 denotes a wheel house, 15 denotes a seat belt pulled out of the seat belt retractor 2, 16 denotes a sash guide for the seat belt 15, 17 denotes a rear seat backrest, 18 denotes a parcel tray, and 19 denotes a luggage compartment.

In FIG. 2, reference numerals 20 and 21 denote upper and lower brackets for fixing the seat belt retractor 2 to the rear pillar inner panel 4, respectively, 22 denotes a pin for fixing the bracket 20 above the seat belt retractor 2 to the rear pillar inner panel 4, 23 denotes a unified screw for fixing the bracket 21 under the seat belt retractor 2 to the strut top 11, 24 denotes a unified screw for fixing the rear pillar inner reinforcement member 13 to the rear pillar inner panel 4, and 25 denotes a rear pillar trim disposed on the inner side of the rear pillar inner panel 4.

In this embodiment, the strut top 11 is formed of normal plate thickness, and the rear pillar inner reinforcement member 13 is vertically disposed and fixed, so that this portion has sufficient strength. Therefore, a special reinforcement member need not be installed at the portion where the seat belt retractor 2 is fixed.

Further, since the rear pillar inner reinforcement member 3 covers the seat belt retractor 2 on the inner side of the reinforcement member 13, it is unnecessary to put a cover over the seat belt retractor 2 to prevent a preservative from sticking when a preservative is applied onto the wall surfaces defining a space surrounded by the rear pillar inner panel 4, the side body outer panel 5, and a not illustrated wheel house.

Furthermore, since the seat belt retractor 2 is positioned on the strut top 11, the unified screw 23 for fixing the seat belt retractor 2 can be fastened from the cabin side. Therefore, it is unnecessary for the worker to put his/her upper body in the luggage compartment; work can be done in a natural posture.

Still further, since the seat belt retractor 2 is positioned on the strut top 11, the distance between the seat belt retractor 2 and the passenger who wears the seat belt on the rear seat is decreased. Therefore, the rolling amount of the seat belt retractor 2 can be reduced.

As described above, according to the present invention, in the seat belt device having the seat belt retractor installed to the rear pillar inner panel on which the strut top is disposed, the strut top is formed of a normal plate thickness because the seat belt retractor is installed on the strut top. Therefore, sufficient strength can be provided without a special reinforcement member, so that it is unnecessary to install a special reinforcement member at the portion where the seat belt retractor 2 is fixed, thereby the manufacturing cost being reduced.

Also, according to the present invention, since the seat belt retractor is installed on the strut top, the seat belt retractor can be covered on the inner side of the rear pillar inner reinforcement member by using the rear pillar inner reinforcement member disposed on the outer side of the rear pillar inner panel. Therefore, it is unnecessary to put a cover over the seat belt retractor to prevent a preservative from sticking when a preservative is applied onto the wall surfaces defining a space surrounded by the rear pillar inner panel, the side body outer panel, and the wheel house. As a result, the application of preservative is facilitated and the work efficiency is improved.

Further, since the seat belt retractor is positioned on the strut top, the fixing work of the seat belt retractor can be performed from the cabin side. Therefore, it is unnecessary for the worker to put his/her upper body in the luggage compartment; work can be done in a natural posture. As a result, the assembly workability can be enhanced.

Still further, since the seat belt retractor is positioned on the strut top, the distance between the seat belt retractor and the passenger who wears the seat belt is decreased. Therefore, the rolling amount of the seat belt retractor can be reduced, thereby the cost being lowered.

I claim:

1. A seat belt device for a vehicle having a seat belt retractor installed on a rear pillar inner panel on which a strut top is disposed, wherein said seat belt retractor is positioned on said strut top, wherein a rear pillar inner reinforcement member is disposed between said rear pillar inner panel and a side body outer panel, said rear pillar inner reinforcement member covering said seat belt retractor on the inner side of said reinforcement member and being fixed to said rear pillar inner panel.

* * * * *